UNITED STATES PATENT OFFICE.

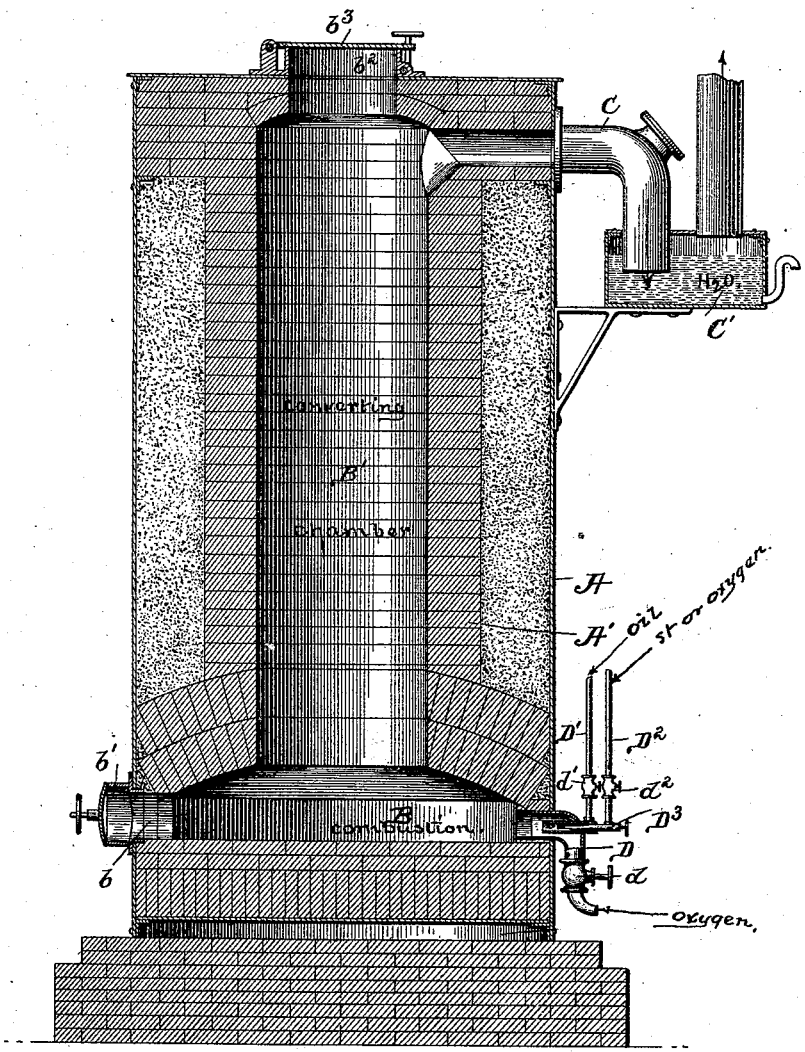

CHARLES F. ADOLF CONVERT, OF CHICAGO, ILLINOIS, ASSIGNOR TO THE LIQUID CARBONIC ACID MANUFACTURING COMPANY, OF SAME PLACE.

PROCESS OF MAKING FUEL-GAS FROM CRUDE OIL.

SPECIFICATION forming part of Letters Patent No. 517,681, dated April 3, 1894.

Application filed March 10, 1891. Serial No. 384,400. (No model.)

*To all whom it may concern:*

Be it known that I, CHARLES FREDERICK ADOLF CONVERT, of Chicago, in the county of Cook and State of Illinois, have invented certain new and useful Improvements in the Process of Making Fuel-Gas from Crude Oil; and I do hereby declare that the following is a full, clear, and exact description thereof, reference being had to the accompanying drawing, and to the letters of reference marked thereon, which forms a part of this specification.

This invention relates to a process of making fuel gas from oil and consists essentially in conducting the oil in sprayed form into a heated retort or chamber, together with steam or an indifferent gas, and mixing the same with air or pure oxygen in quantity less than required for complete combustion thereby producing a gas consisting of an admixture of carbon-monoxide and hydrogen. The heat produced by the partial combustion of the oil maintains the retort or chamber at a sufficiently high temperature, and the production of gas is thus carried on uninterruptedly in contradistinction to an alternating process or one embracing two or more steps.

I show in the accompanying drawing a sectional view of one form of apparatus by which my process of making fuel gas from crude oil may be practiced.

To first describe said drawing:—A, is a shell provided interiorly with fire brick A', so built, arranged and constructed as to form in its lowermost portion a relatively small chamber B, and a connecting tubular or cylindric space or chamber B'.

$b$, is a suitable man-hole in one end or side of the chamber B, which is covered by a cap $b'$.

$b^2$, is the outlet near the top of the chamber B, which is covered by a suitable cap or door $b^3$.

C, is a passage-way or conduit leading from the farther end of the chamber B', to a seal C', or to any suitable tank into which it is desired to deliver the gas.

D, is a pipe communicating with the chamber B, having a valve $d$, and through which pipe oxygen is supplied to the chamber B.

D', and $D^2$, are oil and steam supply pipes respectively, each provided with suitable valves $d'$, $d^2$, for controlling the supply of oil and steam to the chamber B.

I practice my new process in the following manner:—I first heat the retort B, B', by any convenient means, as for instance by a fire of wood made therein. I then introduce oil through the pipe D', and at the same time steam or an indifferent gas under pressure through the pipe $D^2$, passing said oil and steam or gas through a burner $D^3$, of any suitable construction that will permit the oil to be sprayed or injected into the chamber B, in a finely divided state, by the steam or gas. Air or oxygen is also admitted through the pipe D, and combustion takes place by reason of the heated state of the retort. The quantity of air or oxygen is so regulated or limited that a partial combustion only of the oil will take place in the retort, or in other words, such re-combination of the elements of the oil and steam with the oxygen supplied to the retort as will produce an admixture of carbon monoxide and hydrogen gas. The partial combustion is sufficient to maintain the desired temperature in the fire brick A, and in the chambers B, and B', constituting the retort. The products of this partial combustion pass upwardly into the chamber B', from which they are passed off through the pipe C, to the desired receiving tank.

The steam being used mainly as a sprayer for the oil is not an essential element and in its place any indifferent gas may be used.

By the expression "an indifferent gas" used herein, I mean a gas indifferent to combustion; that is to say, a gas that cannot be further oxidized or acted upon by oxygen in the process of burning, such as $CO^2$ carbon-dioxide or nitrogen.

It will of course, be understood that inasmuch as the steam or indifferent gas contains a certain proportion of oxygen, the quantity of air or oxygen admitted to the retort with the oil and steam or indifferent gas, will be such that, when added to that contained in the steam or indifferent gas, the total quantity of oxygen will be sufficient only to produce carbon monoxide and hydrogen, as hereinbefore stated.

Oxygen under pressure may be used instead of steam as a means of spraying the oil, and in this case it will be supplied to the burner $D^3$, through the pipe $D^2$, and the pipe D will be dispensed with. By injecting the oil and oxygen into a closed retort and limiting the supply of oxygen so as to produce partial combustion only of the oil, I utilize all the heat units from such partial combustion to maintain the desired temperature in the retort and I prevent cooling of the retort and am enabled to produce a superior quality of fuel gas from crude oil without any expensive apparatus and in an exceedingly simple manner.

It will be noted that the partial combustion of the oil and heating of the retort and the converting of the oil into gas is carried on simultaneously and uninterruptedly as long as desired, and that the retort will remain perfectly clean. The apparatus therefore, does not require to be shut down from time to time in order to remove carbon and other impurities from the combustion chamber, as is the case now with all devices used in the various processes for making fuel gas; it being obvious that there can be no free carbon deposited in the retort inasmuch as the carbon being in an incandescent state will immediately combine with the oxygen present to form carbon-monoxide which is one of the gases intended to be produced by the process.

In place of crude oil I may of course use other hydrocarbons and changes may be made in the retort if desired, and the apparatus although represented as extending vertically, may of course be arranged in any other convenient position.

I claim as my invention—

The method of making fuel gas by a continuous process, which consists in injecting into a heated retort or chamber oil in a sprayed form and an indifferent gas, together with oxygen, in addition to the oxygen contained in said indifferent gas, in quantity less than that required for producing complete combustion and sufficient only for making carbon-monoxide and hydrogen, whereby a temperature is maintained within the retort or chamber sufficient to produce ignition of the elements introduced as they enter the same, and whereby the partial combustion of the combination of elements necessary for fixing the gas is continuously accomplished, and continually withdrawing the resultant gas from the retort or chamber, substantially as described.

In testimony that I claim the foregoing as my invention I affix my signature in presence of two witnesses.

C. F. ADOLF CONVERT.

Witnesses:
TAYLOR E. BROWN,
GEORGE W. HIGGINS, Jr.